US010146995B2

(12) United States Patent
Nishizawa et al.

(10) Patent No.: US 10,146,995 B2
(45) Date of Patent: Dec. 4, 2018

(54) STORAGE MEDIUM STORING A PROGRAM, INFORMATION PROCESSING DEVICE, AND CONTROL METHOD OF AN INFORMATION PROCESSING DEVICE FOR KEYWORD AND RELATIONSHIP-BASED WORD DETECTION

(71) Applicant: Seiko Epson Corporation, Tokyo (JP)

(72) Inventors: Koji Nishizawa, Shiojiri (JP); Moonhee Lee, Matsumoto (JP)

(*) Notice: Subject to any disclaimer, the term of this patent is extended or adjusted under 35 U.S.C. 154(b) by 0 days.

(21) Appl. No.: 15/388,231

(22) Filed: Dec. 22, 2016

(65) Prior Publication Data

US 2017/0185834 A1    Jun. 29, 2017

(30) Foreign Application Priority Data

Dec. 28, 2015 (JP) ................................. 2015-256843

(51) Int. Cl.
*G06Q 20/20* (2012.01)
*G06K 9/00* (2006.01)
*G06K 15/02* (2006.01)
*G06K 9/20* (2006.01)

(52) U.S. Cl.
CPC ....... *G06K 9/00469* (2013.01); *G06K 9/2072* (2013.01); *G06K 15/022* (2013.01); *G06K 15/028* (2013.01); *G06K 15/1822* (2013.01); *G06K 15/1835* (2013.01); *G06Q 20/209* (2013.01)

(58) Field of Classification Search
None
See application file for complete search history.

(56) References Cited

U.S. PATENT DOCUMENTS

| 8,144,351 B2* | 3/2012 | Sato ...................... G06F 3/1222 358/1.1 |
| 8,259,124 B2* | 9/2012 | Averett ............. G06F 17/30864 345/581 |
| 8,760,689 B2* | 6/2014 | Saito .................... G06F 3/1203 358/1.1 |
| 9,253,361 B2* | 2/2016 | Enomoto ........... H04N 1/32112 |
| 9,779,589 B2* | 10/2017 | Suzuki ..................... G07G 5/00 |

(Continued)

FOREIGN PATENT DOCUMENTS

| JP | 2004-164218 A | 6/2004 |
| JP | 2012-027633 A | 2/2012 |

(Continued)

OTHER PUBLICATIONS

Machine translation of Japanese Pat. Publ. 2012027633 to Aomura et al., published Nov. 2014.*

*Primary Examiner* — Paul F Payer
(74) *Attorney, Agent, or Firm* — Nutter McClennen & Fish LLP; Alex Nagorniy

(57) ABSTRACT

Information that is printed can be correctly analyzed. A program that can be read and executed by the controller of a computer has a function of acquiring and deconstructing information that is printed by a printer as text data written as text, generating words; and a function of detecting from the generated words, based on keyword information and relation information describing a relationship between the keyword information and the word to detect, a target word to detect.

20 Claims, 16 Drawing Sheets

(56) References Cited

U.S. PATENT DOCUMENTS

2011/0087535 A1* 4/2011 Yoshizawa ............. G06Q 20/20
                                                        705/14.26
2015/0002889 A1   1/2015 Takamoto
2016/0006886 A1*  1/2016 Sato ................... H04N 1/00965
                                                        358/1.15

FOREIGN PATENT DOCUMENTS

JP      2014-041442 A    3/2014
JP      2014-215865 A    11/2014

* cited by examiner

421

| RECORD IDENTIFIER | SERIAL NUMBER | PRINT DATA | PRINTED TEXT DATA |
|---|---|---|---|

J12 — RECORD IDENTIFIER
J11 — SERIAL NUMBER

```
WORD「1234」
WORD「XXXXStreet、New」
WORD「York」
WORD「TEL」
WORD「12-345-678」
WORD「——————————————」
WORD「Check#:」
WORD「C0001」
WORD「1/1/2015/12:00」
WORD「——————————————」
WORD「1」
WORD「Beer」
WORD「10.00」
WORD「1」
WORD「Toy」
WORD「60.00」
WORD「~~~~~~~~~~~~~~」
WORD「SUBTOTAL」
WORD「70.00」
WORD「TAX」
WORD「6.13」
WORD「TOTAL」
WORD「$76.13」
WORD「——————————————」
WORD「THANK」
WORD「YOU!」
```

FIG. 9

| | | AD1 |
|---|---|---|
| AREA 1 (AREA AA1) | LINE 1 | WORD 「1234」 |
| | | WORD 「XXXXStreet、New」 |
| | | WORD 「York」 |
| | LINE 2 | WORD 「TEL」 |
| | | WORD 「12-345-678」 |
| AREA 2 (AREA AA2) | LINE 4 | WORD 「Check#:」 |
| | | WORD 「C0001」 |
| | LINE 5 | WORD 「1/1/2015/12:00」 |
| AREA 3 (AREA AA3) | LINE 7 | WORD 「1」 |
| | | WORD 「Beer」 |
| | | WORD 「10.00」 |
| | LINE 8 | WORD 「1」 |
| | | WORD 「Toy」 |
| | | WORD 「60.00」 |
| AREA 4 (AREA AA4) | LINE 10 | WORD 「SUBTOTAL」 |
| | | WORD 「70.00」 |
| | LINE 11 | WORD 「TAX」 |
| | | WORD 「6.13」 |
| | LINE 12 | WORD 「TOTAL」 |
| | | WORD 「$76.13」 |
| AREA 5 (AREA AA5) | LINE 14 | WORD 「THANK」 |
| | | WORD 「YOU!」 |

FIG. 11

STORAGE MEDIUM STORING A PROGRAM, INFORMATION PROCESSING DEVICE, AND CONTROL METHOD OF AN INFORMATION PROCESSING DEVICE FOR KEYWORD AND RELATIONSHIP-BASED WORD DETECTION

This application claims priority under 35 U.S.C. § 119 to Japanese Patent Application No. 2015-256843 filed on Dec. 28, 2015, the entire disclosure of which is expressly incorporated by reference herein.

BACKGROUND

1. Technical Field

The present invention relates to a storage medium storing a program, an information processing device, and a control method of an information processing device.

2. Related Art

Technology for converting output data output from the transaction processor of a POS terminal to a data format that can be interpreted by an external device, sending the converted data to the external device, and managing the transmitted data on the external device is described in JP-A-2012-27633, for example.

At a POS terminal that runs processes based on transactions such as the POS terminal described in JP-A-2012-27633, either the POS terminal has printing capability and prints receipts, or a printer connected to the POS terminal prints receipts, based on the transactions. Various information, including information related to the transactions, is printed on the receipts. The information printed on the receipts may also include valuable information that can be used in other ways, but the technology of the related art is unable to desirably detect the useful information from the printed information.

SUMMARY

At least one of objective of the present invention is to enable desirably detect useful information from printed information.

A program according to one aspect of the invention can be executed by a computer and exchange information with a first program. The first program has a function of deconstructing into words text data of information that is printed as text; and a function of detecting a word to detect from the resulting words based on a keyword and a relationship between the keyword and a word to detect. The program has functions of: receiving keyword information specifying a keyword, and a related information statement specifying a relationship between the keyword information and the target word to detect; outputting the specified keyword information and relation information to the first program; and receiving input of information specifying the target word to detect from the first program.

A first aspect of the invention is a non-transitory controller readable medium storing a program causing a controller in a computer to execute steps including: receiving print information from a printer with which the computer can communicate, the print information being text data written as text; deconstructing the text data and generating multiple words; acquiring keyword information identifying a keyword, and relation information identifying a relationship between the keyword information and a word to detect; and detecting from the multiple words, based on the keyword information and relation information, the word to detect.

The non-transitory controller readable medium in this aspect of the invention enables deconstructing information contained in text data and generating words, and then detecting a target word to detect based on keyword information and the relationship between the keyword information and the word to detect. As a result, desired information contained in information that is printed can be accurately detected.

In another aspect of the invention, the program includes a first program and a second program configured to exchange information therebetween. The first program causes the controller to execute steps including: deconstructing the text data and generating multiple words; receiving input of the keyword information and relation information from the second program; detecting from the multiple words, based on the keyword information and relation information, the word to detect; and outputting to the second program the detected word to detect. The second program causes the controller to execute steps including receiving input of the word to detect from the first program.

This storage medium enables efficient processing by two program.

In another aspect of the invention, the keyword information is information related to a payment transaction process.

In another aspect of the invention, the print information is printed by the printer as a receipt; and the information processing device and the printer are in a server-client relationship.

This configuration is useful in a POS system.

In another aspect of the invention the program includes a step of the controller displaying information indicating the word that was detected.

This storage medium enables to user to read and know the word that was detected.

In another aspect of the invention, the relation information is data type information indicating a data type; and the program causes the controller to execute steps including: detecting from the multiple words, based on the keyword information and data type information, the word to detect.

This storage medium enables more precisely detecting the word to detect based on the data type of the word to detect.

Another aspect of the invention is a control method of an information processing device having a controller, the control method using the controller to execute steps including: receiving print information from a printer with which the information processing device can communicate, the print information being text data written as text; deconstructing the text data and generating multiple words; acquiring keyword information identifying a keyword, and relation information identifying a relationship between the keyword information and a word to detect; and detecting from the multiple words, based on the keyword information and relation information, the word to detect.

The control method in this aspect of the invention enables deconstructing information contained in text data and generating words, and then detecting a target word to detected based on keyword information and the relationship between the keyword information and the target word to detect. As a result, desired information contained in information that is printed can be accurately detected.

Another aspect of the invention is an information processing device including: a communicator configured to communicate with a printer; a controller; and storage storing a program; the controller reading the program from the storage and executing steps including: receiving print information from the printer, the print information being text data written as text; deconstructing the text data and generating multiple words; acquiring keyword information identifying a keyword, and relation information identifying a relationship between the keyword information and a word to detect; and detecting from the multiple words, based on the keyword information and relation information, the word to detect.

The information processing device in this aspect of the invention can deconstruct information contained in text data into words, and then detect a target word to detected based on keyword information and the relationship between the keyword information and the target word to detect. As a result, desired information contained in information that is printed can be accurately detected.

BRIEF DESCRIPTION OF THE DRAWINGS

FIG. 6 shows an example of the structure of a text data manager database.

FIG. 9 shows examples of word data.

FIG. 11 shows examples of area data.

DESCRIPTION OF EMBODIMENTS

A preferred embodiment of the present invention is described below with reference to the accompanying figures.

Figure 1:
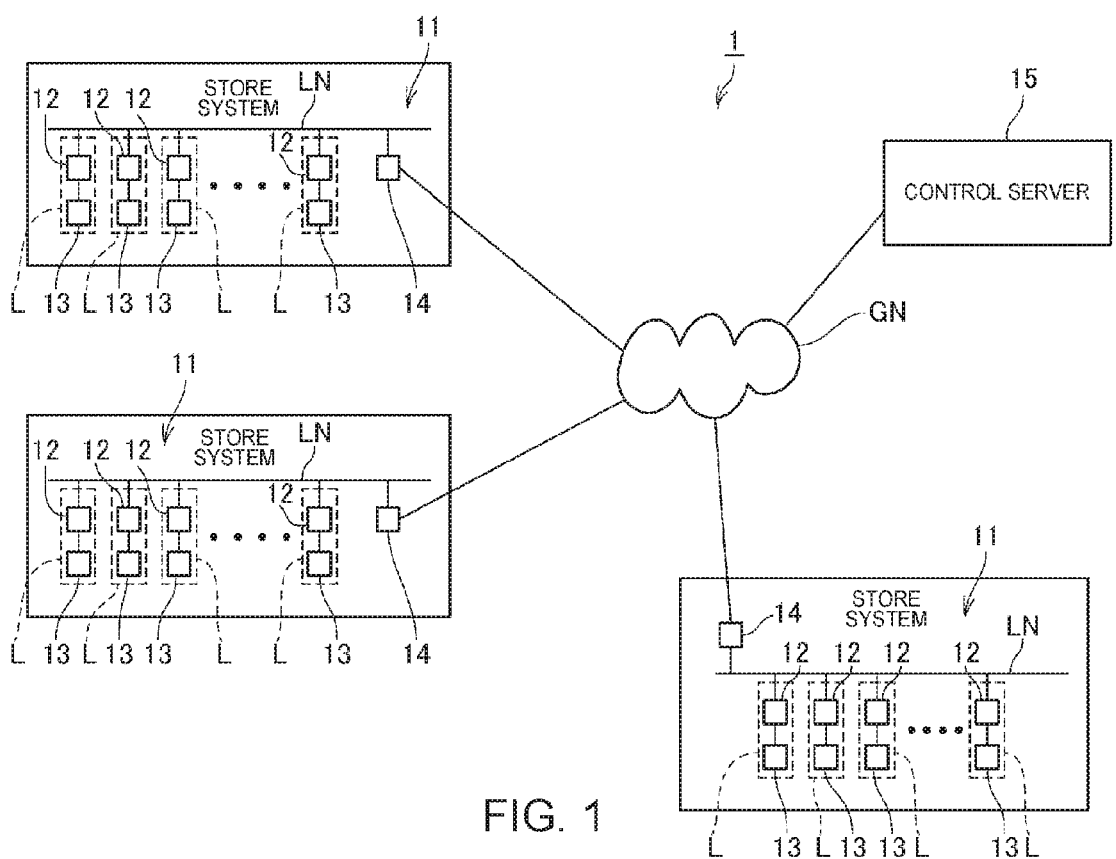
FIG. 1 illustrates the configuration of a transaction processing system according to an embodiment of the invention.

FIG. 1 shows the configuration of a transaction processing system 1 (information processing system) according to one embodiment of the invention.

As shown in FIG. 1, the transaction processing system 1 includes a plurality of store systems 11. A store system 11 is a system that is used in retail businesses such as supermarkets, convenience stores, department stores, and restaurants. The business may be any facility in which a product is provided and a customer transaction is performed according to the sale of the product. In this embodiment, the product is not limited to a physical product supplied to the customer, and means any product that is provided to a customer in exchange for payment, including services provided to customers and food or drink provided to customers.

The store system 11 has functions for processing transactions according to the products purchased by customers, and producing receipts based on the transactions.

A counter L where customer transactions are processed is located in the business where the store system 11 is deployed. A printer 12 capable of recording on roll paper (recording media) is installed at the counter L. A tablet terminal 13 that connects and communicates wirelessly with the printer 12 and controls the printer 12 is also disposed at the counter L.

During a transaction at the counter L, the cash register operator reads barcodes from the products or product packaging using a barcode reader BR connected to the printer 12, and inputs information related to the transaction to the tablet terminal 13. The printer 12 sends data based on reading with the barcode reader BR to the tablet terminal 13. Based on the data acquired by reading with the barcode reader BR and received from the printer 12, and transaction-related input from the operator, the tablet terminal 13 causes the printer 12 to produce a receipt. The receipt produced by the printer 12 is then given by the operator to the customer.

The configuration, functions, and processes based on the functions of the printer 12 and tablet terminal 13 are described further below.

A local area network LN is deployed in the store system 11.

The printer 12 connects to the local area network LN using a communication protocol used on the LAN.

A communication device 14 is also connected to the local area network LN. The communication device 14 is an interface device that connects to the local area network LN and a global network GN including the Internet, telephone network, and other communication networks. The communication device 14 has the functions of a modem (or ONU (Optical Network Unit)), a router, a NAT (Network Address Translation) device, and a DHCP (Dynamic Host Configuration Protocol) server. The communication device 14 transfers data that is sent and received between devices when a device connected to the local area network LN and a device connected to the global network GN communicate with each other. Note that the communication device 14 is represented by a single block in FIG. 1, but the communication device 14 may comprise plural devices with different functions.

The printer 12 can also access the global network GN through the communication device 14.

A control server 15 (information processing device) is connected to the global network GN. The control server 15 is a cloud server in a cloud system in which the printer 12 is a client. More specifically, when triggered by a request from a client, for example, the control server 15 runs a specific process. The control server 15 sends data based on the result of the process to the client as needed. Note that the control server 15 is represented by a single block in FIG. 1, but this does not mean that the control server 15 is embodied by a single server device. For example, the control server 15 may comprise a plurality of server devices. More specifically, the control server 15 may be configured in any way enabling executing the processes described below.

Figure 2:
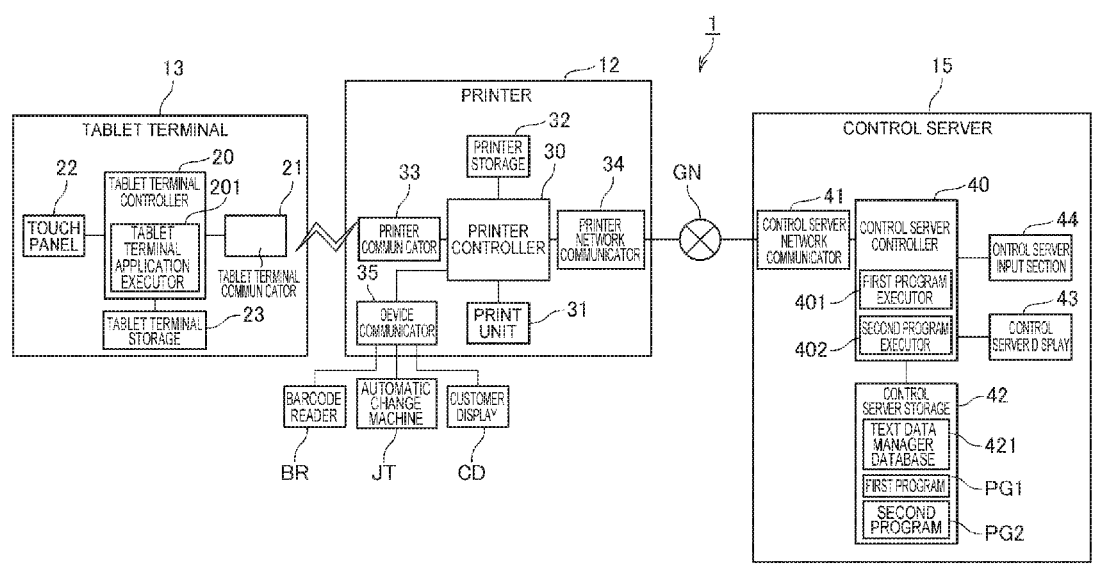
FIG. 2 is a block diagram illustrating the functional configuration of devices in the transaction processing system.

FIG. 2 is a block diagram illustrating the functional configuration of devices in the transaction processing system 1.

The tablet terminal 13 is a tablet (flat panel) computer with a touch panel 22 covering a large area on the front. When a transaction is processed at the counter L, the tablet terminal 13 functions as a host computer that runs transaction-related processes and controls the printer 12.

As shown in FIG. 2, the tablet terminal 13 includes a tablet terminal controller 20, a tablet terminal communicator 21, a touch panel 22, and a tablet terminal storage 23.

The tablet terminal controller 20 includes a CPU, ROM, RAM, and other peripheral circuits, and controls the tablet terminal 13. A specific application ("tablet terminal application TAP" below) is preinstalled in ROM or other memory on the tablet terminal 13. The CPU of the tablet terminal controller 20 functions as a tablet terminal application executor 201 by reading and running the tablet terminal application TAP and associated programs.

The tablet terminal communicator 21 communicates with the printer 12 according to a specific communication protocol as controlled by the tablet terminal controller 20. The wireless communication standard for wireless communication between the tablet terminal 13 and printer 12 may be a wireless LAN standard compatible with an ad hoc mode, a wireless LAN standard compatible with an infrastructure mode, or a near-field communication standard such as Bluetooth®, for example.

The touch panel 22 combines an LCD panel or other type of display panel, and a touch sensor overlaid to the display panel. The display panel displays images as controlled by the tablet terminal controller 20. The touch sensor detects touch operations by the user and outputs to the tablet terminal controller 20. The tablet terminal controller 20 then executes processes appropriate to the touch operation based on input from the touch sensor.

The tablet terminal storage 23 has flash ROM or other nonvolatile memory, and stores data.

The printer 12 is a thermal line printer that holds roll paper and forms dots on the stored roll paper with a line thermal head to print images.

As shown in FIG. 2, the printer 12 has a printer controller 30, print unit 31 (printing mechanism), printer storage 32, printer communicator 33, printer network communicator 34, and device communicator 35.

The printer controller 30 includes a CPU, ROM, RAM, and other peripheral circuits, and controls parts of the printer 12 by the CPU reading and running firmware or other program stored in ROM or other memory.

The print unit 31 includes mechanisms related to printing on roll paper, such as a conveyance mechanism for conveying roll paper stored inside the cabinet of the printer 12, a printing mechanism for forming dots and printing images on the roll paper with a thermal head, and a cutter mechanism for cutting the roll paper at a specific position. As controlled by the printer controller 30, the print unit 31 conveys the roll paper with the conveyance mechanism, prints receipt-related images on the roll paper by the printing mechanism while, and then cuts the roll paper at a specific position with the cutter mechanism, producing a receipt.

The printer storage 32 has flash ROM or other nonvolatile memory, and stores data.

The printer communicator 33 communicates with the tablet terminal 13 according to a specific communication protocol as controlled by the printer controller 30.

The printer network communicator 34 communicates with devices connected to the global network GN (including the control server 15) according to a specific communication protocol as controlled by the printer controller 30.

The device communicator 35 includes an interface board with ports such as a USB port, a serial communication port other than a USB port, or other type of port. A device can connect to each port. The device communicator 35 communicates with the devices connected to the printer 12 through the ports as controlled by the printer controller 30.

Note that the device communicator 35 may be configured with a wireless communication capability for communicating wirelessly with devices.

A barcode reader BR, customer display CD, and an automatic change machine JT are examples of devices that connect to the tablet terminal 13 in this example.

The barcode reader BR is used to read barcodes from products and product packaging, and outputs the read result to the device communicator 35. The device communicator 35 outputs the data input from the barcode reader BR to the printer controller 30.

The customer display CD displays transaction-related information as controlled by the printer controller 30. The information presented on the customer display CD can be checked by the customer involved in the transaction at the counter L.

The automatic change machine JT has cash receiver openings for receiving cash inserted by the customer and cash dispenser openings for dispensing change according to the amount received, and when cash is input through the cash receiver, the change due is dispensed from the cash return openings as controlled by the printer controller 30.

The control server 15 is a cloud server of which the printer 12 is a client.

As shown in FIG. 2, the control server 15 includes a control server controller 40 (control unit; controller), control server network communicator 41, control server storage 42, control server display 43, and control server input section 44.

The control server controller 40 includes a CPU, ROM, RAM, and other peripheral circuits, and controls the control server 15. The CPU reads and runs programs stored in ROM or other memory, and controls other parts of the control server 15.

The control server network communicator 41 communicates with devices connected to the global network GN (including printers 12) according to a specific communication protocol as controlled by the control server controller 40.

The control server storage 42 stores data (including a text data manager database 421).

A first program PG1 and a second program PG2 are installed on the control server storage 42 of the control server 15. The control server storage 42 stores the first program PG1 (including data related to the program) and the second program PG2 (including data related to the program).

The control server controller 40 also has a first program executor 401 and a second program executor 402. The first program executor 401 executes processes by reading (including data related to the program) and running the first program PG1. The second program executor 402 executes processes by reading (including data related to the program) and running the second program PG2.

The control server display 43 includes an LCD panel or other type of display panel, and displays information as controlled by the control server controller 40.

The control server input section 44 includes a keyboard, mouse, or other type of input device, is connected to the input device(s), detects input to the input devices, and outputs to the control server controller 40. Based on input from the control server input section 44, the control server controller 40 runs processes based on the input to the input device.

Processes run by the tablet terminal 13, printer 12, and control server 15 when a customer transaction is processed at the counter L are described next.

Figure 3:
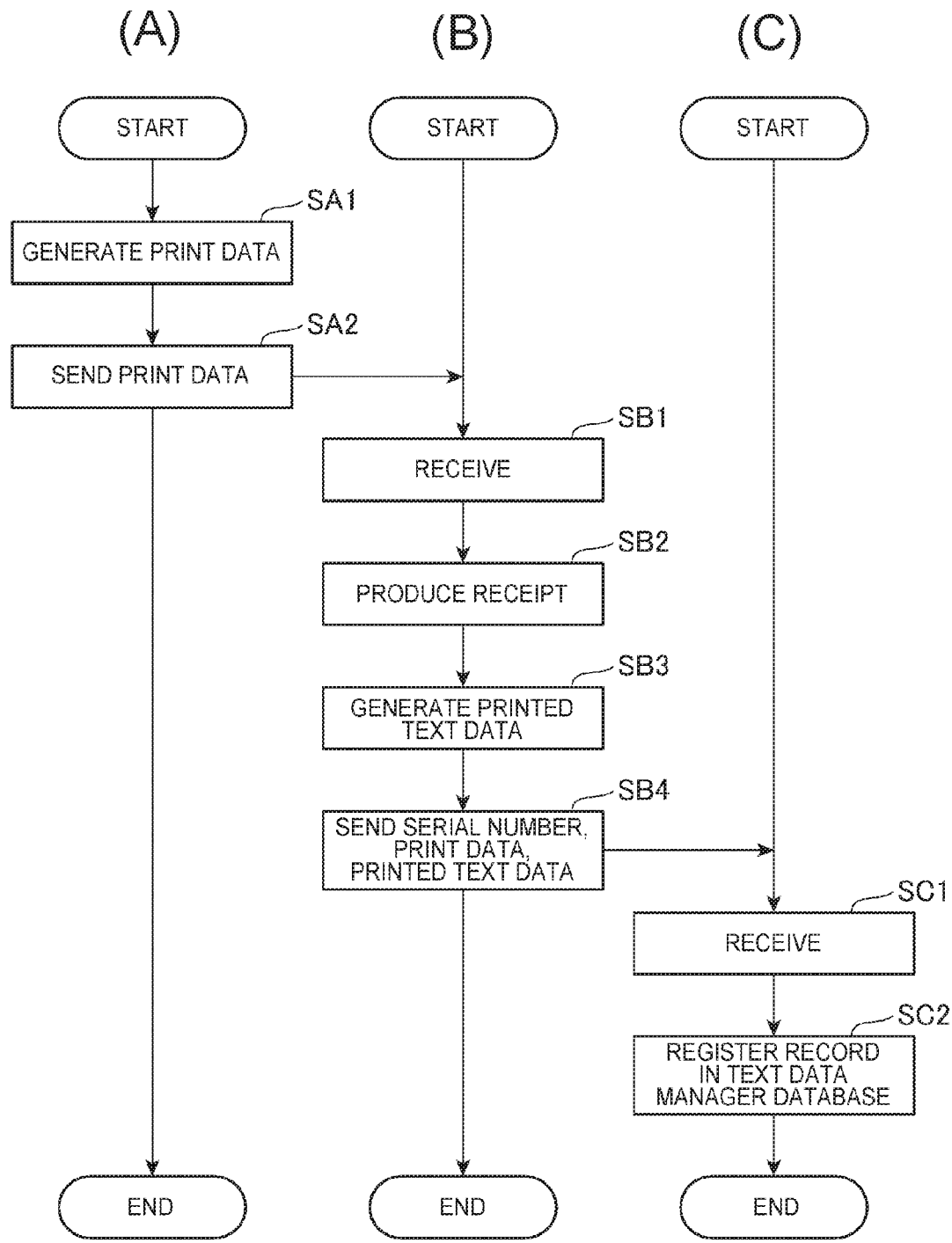
FIG. 3 is a flowchart of processes of a tablet terminal, printing device, and control server.

FIG. 3 is a flow chart of the operation of the tablet terminal 13, printer 12, and control server 15 when processing a transaction at the counter L. column (A) of FIG. 3 describes the process of the tablet terminal 13, column (B) describes the process of the printer 12, and column (C) describes the process of the control server 15.

As shown in column (A) of FIG. 3, the tablet terminal application executor 201 of the tablet terminal controller 20 of the tablet terminal 13 executes a transaction process (payment process) appropriately to the products purchased by the customer, and generates print data based on the transaction process (step SA1).

More specifically, in step SA1, the tablet terminal application executor 201 executes the transaction process based on input from the printer 12 (the barcode reader BR connected to the printer 12) and input from the operator on the touch panel 22 based on the products purchased by the customer, and generates receipt information. The receipt information is information the printer 12 prints on the produced receipt. The specific content of the receipt information is described below using examples.

Next, the tablet terminal application executor 201 generates print data based on the generated receipt information. The print data includes control commands instructing producing a receipt with the receipt information printed according to a specific layout. The print data includes plural control commands in the command language of the printer 12.

After generating the print data in step SA1, the tablet terminal application executor 201 controls the tablet terminal communicator 21 to send the generated print data to the printer 12 (step SA2).

As shown in column (B) of FIG. 3, the printer controller 30 of the printer 12 controls the printer communicator 33 to receive the print data (step SB1).

Next, the printer controller 30 controls the print unit 31 to produce a receipt based on the print data received in step SB1 (step SB2). The resulting receipt is given to the customer.

Figure 4:
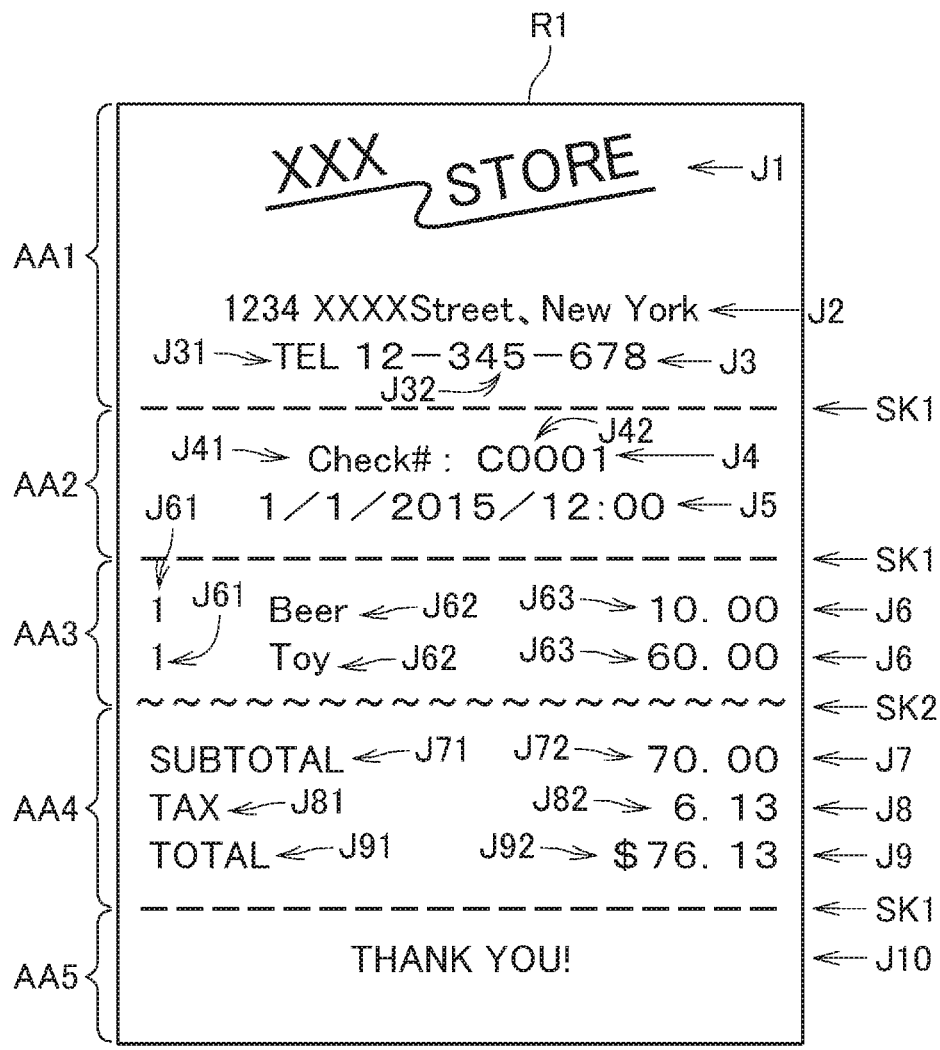
FIG. 4 shows an example of a receipt.

FIG. 4 shows receipt R1 as an example of a receipt produced by a printer 12 based on print data.

Logo information J1 as a graphical representation of the name of the store is printed at the top of the receipt R1 in FIG. 4.

Store address information J2 indicating the address of the store is recorded below the logo information J1 on the receipt R1.

Store telephone number related information J3, which is a text string expressing information related to the telephone number of the store, is printed on the next line after the store address information J2. The store telephone number related information J3 includes store telephone number information J32, which indicates the telephone number of the business. The store telephone number related information J3 also includes a telephone number identifier J31, which is printed at the left side on the same line as the store telephone number information J32, and which is information indicating that the store telephone number information J32 contains the telephone number. As shown in FIG. 4, the telephone number identifier J31 of receipt R1 is a string of the three capital letters TEL.

On the line following the store telephone number related information J3 in the receipt R1 is printed first area break information SK1. The first area break information SK1 is a string of multiple hyphens (-) on the same line.

The print areas of the receipt R1 are separated by the first area break information SK1, and the first area break information SK1 separates the area thereabove from the content therebelow. Below, the area above the first area break information SK1 in receipt R1 is referred to as area AA1.

On the line following the first area break information SK1 on the receipt R1 is printed receipt identification related information J4 identifying the receipt. The receipt identification related information J4 contains a receipt identifier J42 identifying the receipt. The receipt identification related information J4 contains a receipt identification identifier J41, which is printed at the left side on the same line as the receipt identifier J42, and which is information indicating that the receipt identifier J42 is information identifying the receipt.

As shown in FIG. 4, the receipt identification identifier J41 of the receipt R1 starts with the string Check#.

On the line following the receipt identification related information J4 on the receipt R1 is printed a time stamp J5 indicating the date and time the receipt was printed.

Area break information SK1 is then printed below the time stamp J5.

The first area break information SK1 and the second area break information SK1 on the receipt R1 define another print area in which specific information is printed. The area of the receipt R1 between the first area break information SK1 and the second area break information SK1 is referred to below as area AA2.

Starting from the line following the second area break information SK1 in the receipt R1 is printed one or more lines of transaction detail information J6 (two lines shown in FIG. 4).

The detail information J6 is information related to the products purchased by the customer. The detail information J6 is printed on the receipt R1 for each type of product purchased by the customer. Therefore, if the customer purchased three different products, three lines of detail information J6 are printed, one for each product type. When multiple lines of detail information J6 are printed on a receipt R1, the multiple lines of detail information J6 are consecutively printed to different lines.

The detail information J6 contains on each line purchased quantity information J61, product name information J62, and price information J63. The purchased quantity information J61 is information expressing the quantity (count) of the corresponding product as an integer (without a decimal point). The product name information J62 is information expressing the name of the corresponding product as a text string. The price information J63 is information expressing the price of the corresponding product as a value that, in this example, includes a decimal point.

The purchased quantity information J61, product name information J62, and price information J63 contained in the detail information J6 are printed on one line of the receipt R1 from left to right in the order: purchased quantity information J61, product name information J62, and then the price information J63.

On the line following the last line of printed detail information J6 on the receipt R1 is second area break information SK2. The second area break information SK2 is a string of multiple tilde (~) characters printed consecutively on one line.

The print area of the receipt R1 is also segmented by the second area break information SK1 and the first second area break information SK2, and the area between the second area break information SK1 on the receipt R1 and the first second area break information SK2 is referred to below as area AA3.

Subtotal related information J7 is printed on the receipt R1 on the line following the first second area break information SK2. The subtotal information J7 contains subtotal information J72. The subtotal related information J7 also contains a subtotal identifier J71, which is printed to the left on the same line as the subtotal information J72, and indicates that the subtotal information J72 contains information indicating the transaction subtotal.

As shown in FIG. 4, the subtotal identifier J71 is an eight character string of the capital letters SUBTOTAL.

On the line following the subtotal related information J7 of the receipt R1 is printed tax related information J8. The tax related information J8 includes tax information J82 showing the amount of tax. The tax related information J8 also contains a tax information identifier J81, which is printed on the left on the same line as the tax information J82 and indicates that the tax information J82 contains the amount of tax.

As shown in FIG. 4, the tax information identifier J81 of the receipt R1 is a string containing the three capital letters TAX.

Transaction total related information J9 is printed on the line following the tax related information J8 on the receipt R1. The transaction total related information J9 contains transaction total information J92 indicating the transaction total. The transaction total related information J9 also contains a transaction total identifier J91, which is printed on the left on the same line as the transaction total information J92 and indicates that the transaction total information J92 contains the transaction total.

As shown in FIG. 4, the transaction total identifier J91 of the receipt R1 is a string containing the five capital letters TOTAL.

Third area break information SK1 is printed on the receipt R1 on the line following the transaction total related information J9.

The print area of the receipt R1 is segmented by the first second area break information SK2 and the third area break information SK1, and the area of the receipt R1 between the first second area break information SK2 and the third area break information SK1 is referred to below as area AA4. The area below the third area break information SK1 is referred to below as area AA5.

Additional information J10 is printed on the receipt R1 on the line following the third area break information SK1. The additional information J10 in this example is a string expressing thanks to the customer receiving the receipt.

When not differentiated, area break information SK1 and second area break information SK2 are referred to as area break information.

Information is thus printed on receipt R1 using the following layout. That is, four instances of area break information are printed in the print area of the receipt R1, and the print area of the receipt is divided from the top by these four area break information instances into five different areas referred to as area AA1, area AA2, area AA3, area AA4, and area AA5.

In area AA1 are sequentially printed the logo information J1, store address information J2, and store telephone number related information J3.

In area AA2 are sequentially printed the receipt identification related information J4 and time stamp J5.

In area AA3 is printed one or more lines of detail information J6. The purchased quantity information J61, product name information J62, price information J63 contained in the detail information J6 are printed on one line from left to right in the order: purchased quantity information J61, product name information J62, and then price information J63.

In area AA4 are sequentially printed the subtotal related information J7, tax related information J8, and transaction total related information J9.

Additional information J10 is printed in area AA5.

As shown in column (B) of FIG. 3, after producing a receipt in step SB2, the printer controller 30 generates printed text data (text data) based on the print data (step SB3). The process of step SB3 is described next.

The printed text data is text data containing the text (character codes) of the information that is printed as text (characters) in the information that is printed based on the print data.

In this embodiment of the invention, control commands ("print string instruction" below) that contain one or more character codes and instruct printing text based on the character codes can be contained in the print data. Information specifying styling to apply to the characters printed based on a print string instruction may also be contained in the print string instructions. Styles that may be applied to the text (characters) includes, for example, bolding, underlining, adding emphasis, inverting black and white, rotation, right justification, center justification, and left justification. The printer storage 32 of the printer 12 stores a font table containing the character codes and font data corresponding to the characters identified by the character codes.

Based on a print string instruction, the printer controller 30 of the printer 12 has capability to convert each of the character codes contained in the command to the corresponding font data, render the font data as image data in RAM or other image buffer to reflect the styling specified by the command corresponding to the font data, and based on the image data rendered in the image buffer, print the characters. The image data is in a format that can be printed by the printhead of the print unit 31.

In step SB3, the printer controller 30 extracts control commands related to printing strings, such as the print string instructions and carriage return commands instructing a carriage return, from the print data. Next, the printer controller 30, based on specific control commands such as carriage return commands contained in the extracted control commands, generates printed text data, which is text data for the information that printed as characters on the receipt.

The information in the printed text data is written in a format reflecting the carriage returns executed when printing.

The information in the printed text data is straight text data, that is, it does not reflect any styling specified by the print string instructions. As a result, if center justification or right justification is specified as styling to apply to some text in the print string instructions, this styling is not reflected when recording the characters in the printed text data.

Note that a space character (also referred to as a space or blank) is also a character to which a character code is assigned, and space characters are also recorded in the printed text data.

Figure 5:
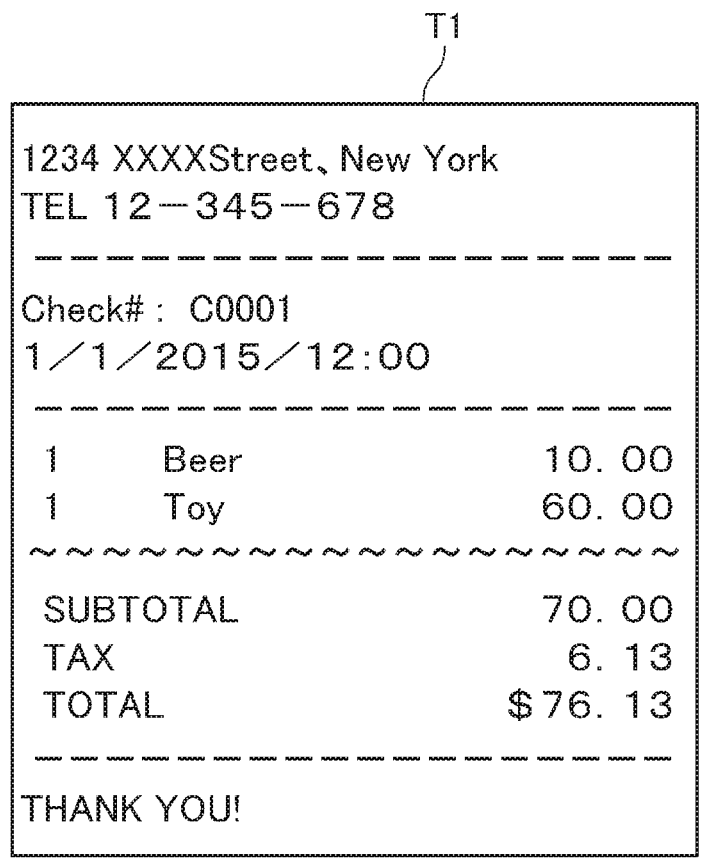
FIG. 5 shows an example of printed text data.

FIG. 5 shows an example of the content of printed text data T1 that is generated based on the print data for the receipt R1 shown in FIG. 4 when the printed text data T1 is stored in RAM or other storage. As will be obvious from comparing FIG. 4 and FIG. 5, the information printed as text in receipt R1 is written in the printed text data T1 in the same printed order and reflecting the locations of the carriage returns in the printed receipt R1.

Note that the logo information J1 is not information that is printed based on character codes, and more specifically is information that is printed based on graphic image data, such as bitmap data. As shown in FIG. 5, information other than the information printed based on font data corresponding to character codes is not recorded in the printed text data.

Next, as shown in column (B) of FIG. 3, after generating the printed text data in step SB3, the printer controller 30 sends a serial number J11, the print data received in step SB1, and the printed text data generated in step SB3, to the control server 15 (step SB4).

The serial number J11 is information uniquely assigned to the printer 12 when the printer 12 is manufactured.

Note that in step SB4, information related to communication required to transmit the serial number J11 (information related to the destination, the protocol used for communication, and the format of the transmitted data, for example) is previously registered in the printer storage 32 of the printer 12.

As shown in column (C) of FIG. 3, the control server controller 40 of the control server 15 controls the control server network communicator 41 to receive the serial number J11, the print data, and the printed text data that were transmitted by the printer 12 (step SC1).

Next, the control server controller 40 creates a record in the text data manager database 421 (step SC2).

FIG. 6 illustrates the structure of information stored in each record of the text data manager database 421.

As shown in FIG. 6, each record in the text data manager database 421 contains a record identifier J12, serial number J11, print data, and printed text data.

The record identifier J12 is information identifying a specific record in the text data manager database 421. Because the record identifier J12 is a value unique to a specific record in the text data manager database 421, it can be used as information identifying the corresponding print data and corresponding printed text data.

In step SC2, the control server controller 40 generates the record identifier J12 according to a specific rule.

Next, the control server controller 40 stores a record relating the generated record identifier J12 to the received serial number J11, the print data, and the printed text data in the text data manager database 421.

As described above, a record is created in the text data manager database 421 in conjunction with producing a receipt in the store.

The control server 15 has a function for detecting, based on a specific record in the text data manager database 421 and in response to a command from the user of the control server 15, the words (described below) contained in the printed text data stored in the specific record.

The process the control server 15 executes to detect words (described below) is described next.

Figure 7:
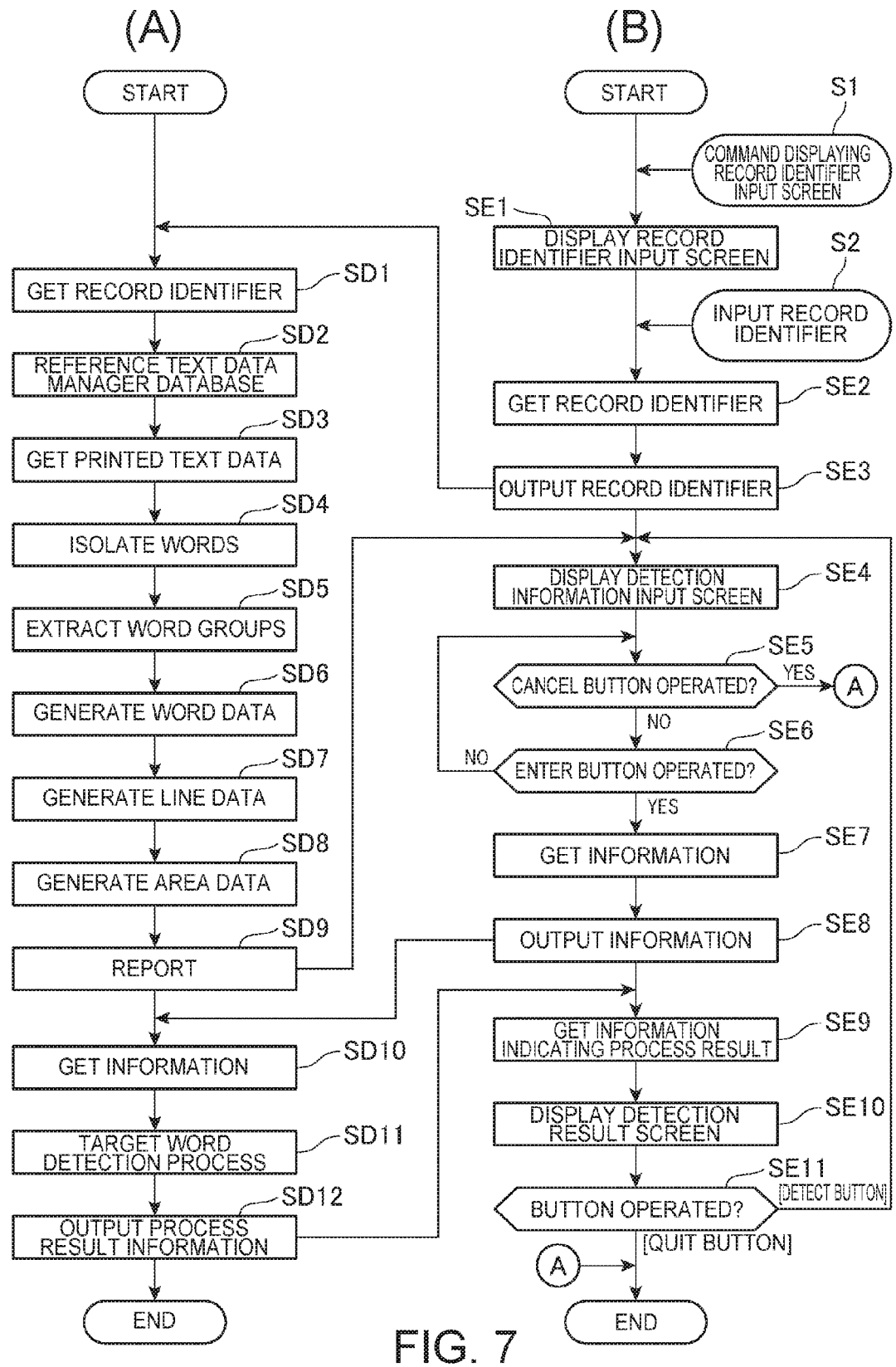
FIG. 7 is a flow chart of a process of the control server.

FIG. 7 is a flowchart of the process the control server 15 executes to detect words. column (A) of FIG. 7 shows the process of the first program executor 401, and (B) shows the process of the second program executor 402.

The user may, for example, want to get specific information printed on a specific receipt. For example, the user may want to get the transaction total information J92 printed on a specific receipt to know the total amount billed to the customer in the transaction for which the receipt was printed. In this example, the user wanting to get specific information printed on a receipt performs the operation described below to cause the control server 15 to detect information contained in the printed text data, and can thereby acquire the desired information. Note that because the printed receipt is given to the customer, the user does not have the receipt.

As shown in column (B) of FIG. 7, the user operating the control server 15 to detect specific information printed on a receipt first operates an input device of the control server 15 to command displaying a record identifier input screen G81 (FIG. 8) (step S1). The control server input section 44 detects input to the input device, and outputs to the control server controller 40.

The second program executor 402, based on input from the control server input section 44, then displays the record identifier input screen G81 (FIG. 8) on the control server display 43 (step SE1).

Figure 8:
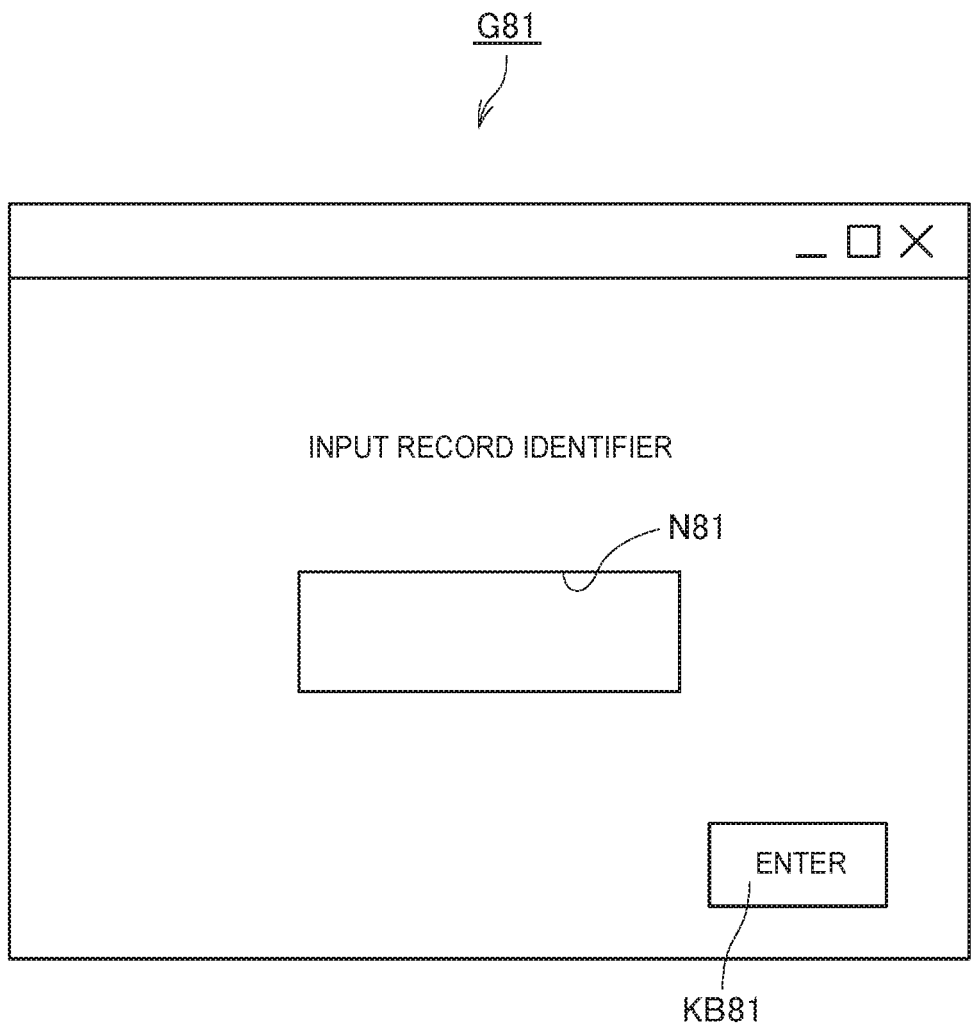
FIG. 8 shows an example of a batch identifier input screen.

FIG. 8 shows an example of the record identifier input screen G81.

As shown in FIG. 8, record identifier input screen G81 has a record identifier input field N81. The record identifier input field N81 is for inputting the record identifier J12.

As shown in FIG. 8, record identifier input screen G81 has an Enter button KB81. Enter button KB81 is for confirming input to the record identifier input screen G81.

The user inputs the record identifier J12 of the receipt from which printed information is to be detected to the record identifier input field N81, operates the Enter button KB81, and confirms input to the record identifier input field N81 (step S2). The user can acquire the record identifier J12 for the receipt to search by a specific means, such as displaying record identifiers J12 stored in the text data manager database 421 of the control server 15 on the control server display 43.

When operation of the Enter button KB81 is detected, the second program executor 402 acquires the record identifier J12 input to the record identifier input field N81 (step SE2).

Next, the second program executor 402 outputs the record identifier J12 acquired in step SE2 to the first program executor 401 (step SE3).

Data can be exchanged between the first program PG1 and second program PG2 by using a specific API (Application Programming Interface), for example.

As shown in column (A) of FIG. 7, the first program executor 401 acquires the record identifier J12 the second program executor 402 output (step SD1).

Next, the first program executor 401 references the text data manager database 421 (step SD2).

Next, the first program executor 401 finds, in the records of the text data manager database 421, the record storing the same record identifier J12 as the record identifier J12 acquired in step SD1 (step SD3).

Below, a control command representing a carriage return in the text data containing the printed text data is expressed as a return character.

The first program executor 401 deconstructs the information contained in the printed text data and creates words (step SD4).

More specifically, the first program executor 401 breaks the information contained in the printed text data into individual words, a word being a continuous string (which may consist of a single character; a single character may also be referred to below as a "string") of characters segmented (separated) by a break character in the printed text data. A continuous string of characters means one or more consecutive actual text characters on one line not containing any break characters. An actual text character is any character other than a break character.

In this embodiment of the invention, break characters include space characters and return characters, and are stored in the control server storage 42.

The printed text data T1 shown in the example in FIG. 5 is deconstructed at the break characters and words are created by the process of the first program executor 401 in step SD4.

The store address information J2 contains the word "1234", the word "XXXStreet, New", and the word "York". Note that because separation between characters in the printed text data T1 in FIG. 5 means there is a space character, and there is a return character at the right end of the line, each line can be separated into individual words.

The telephone number identifier J31 contains the word "TEL", and the store telephone number information J32 contains the word "12-345-678".

The first area break information SK1 contains the word "- - - • • • -".

The receipt identification identifier J41 contains the word "Check#:", and the receipt identifier J42 contains the word "C0001".

The time stamp J5 contains the word "1/1/2015/12:00".

The second area break information SK1 contains the word "- - - • • • -".

In the first line of detail information J6, the purchased quantity information J61 contains the word "1", the product name information J62 contains the word "Beer", and the price information J63 contains the word "10.00".

In the second line of detail information J6, the purchased quantity information J61 contains the word ""1", the product name information J62 contains the word "Toy", and the price information J63 contains the word "60.00".

The first second area break information SK2 contains the word "- - - • • • -".

The subtotal identifier J71 contains the word "SUBTOTAL", and the subtotal information J72 contains the word "70.00".

The tax information identifier J81 contains the word "TAX", and the tax information J82 contains the word "6.13".

The transaction total identifier J91 contains the word "TOTAL", and the transaction total information J92 contains the word "$76.13".

The third area break information SK1 contains the word "- - - • • • -".

The additional information J10 contains the word "THANK", and the word "YOU!".

After step SD4, the first program executor 401 extracts specific plural words from among the words isolated by step SD4 into specific word groups each comprising specific plural words (step SD5). This is described below.

A word group is a group of plural words that together in combination form a single unit of meaning. In the printed text data T1 in FIG. 5, the words "1234," "XXXStreet, New", and "York" individually have no useful meaning. However, when these words are combined into the single word group "1234_XXXStreet, New_York" (where the underscore "_" represents a space character that is also a break character) they form a meaningful unit of information expressing the address of the store (business), that is, store address information J2. In this example, the combination "1234_XXXStreet, New_York" is extracted as a word group in step SD2.

In the printed text data T1 in FIG. 5, the words "THANK" and "YOU!" alone have no particular meaning in this context, but when combined as the word group "THANK_YOU!" form a meaningful unit of information as the additional information J10 expressing appreciation to the customer. In this example, the combination "THANK_YOU!" is extracted as a word group in step SD2.

The first program executor 401 may extract word groups based on the segmented words using the following method.

For example, the first program executor 401 extracts the store address information J2 by the following process. Words, such as "New_York", that may be used as words are previously registered in the control server storage 42 of the control server 15. A word may contain a space character. Rules for expressing an address are also registered in the control server storage 42 of thermal head control server 15. An address rule may, for example, state that addresses in a specific region may be expressed by a street address expressed by a number followed by a street name and information representing a geographical area.

If a string contains words that can be used in an address, and those words are preceded or followed by other words that follow the rules for expressing an address, the first program executor 401 determines that the string of words in information containing registered address words and following the rules for expressing an address are a word group related to the store address information J2.

Any desirable method may be used as the process extracting word groups.

After extracting word groups in step SD5, the first program executor 401 generates word data reflecting the word groups (step SD6). The word data contains the word groups extracted in step SD5, and other words not including the words in the word groups.

FIG. 9 shows an example of the word data TD1 extracted from the printed text data T1 in FIG. 5.

The word groups extracted in step SD5 are referred to below as specific word groups. Of the words segmented in step SD4, the words other than the words contained in the specific word groups are referred to as "specific words." "Target word" is used below when not differentiating between specific words and specific word groups.

After step SD6, the first program executor 401 breaks the target words into the lines in the printed text data at the returns, and generates line data describing the correlation between lines and the target words on each line (step SD7). More specifically, the printed text data is data comprising multiple lines of one or plural target words each. In step SD7, the first program executor 401 determines which target words are on which line, and generates line data describing the relationship between the line number and the target words on that line. Note that returns are not included in the words or target words.

Figure 10:
FIG. 10 shows examples of line data.

FIG. 10 illustrates the content of line data GG1, which is generated based on the printed text data T1 (FIG. 5).

As shown in the line data GG1 in FIG. 10, the words in the printed text data T1 shown in the example in FIG. 5 are separated into lines as shown below by the first program executor 401 in step SD7.

Line 1→word group "1234_XXXStreet, New_York"
Line 2→word "TEL", word "12-345-678"
Line 3→word "- - - • • • -"
Line 4→word "Check#:", word "C0001"
Line 5→word "1/1/2015/12:00"
Line 6→word "- - - • • • -"
Line 7→word "1", word "Beer", word "10.00"
Line 8→word "1", word "Toy", word "60.00"
Line 9→word "- - - • • • -"
Line 10→word "SUBTOTAL", word "70.00"
Line 11→word "TAX", word "6.13"
Line 12→word "TOTAL", word "$76.13"
Line 13→word "- - - • • • -"
Line 14→word group "THANK_YOU!"

Next, the first program executor 401 uses the area break information to separate the information contained in the printed text data into areas. The first program executor 401 then generates area data describing the correlation between areas and the target words in each area, and the line to which each target word belongs (step SD8). This process is described below.

The information printed on a receipt is printed according to rules that do not change (referred to below as basic receipt rules) even if the POS system, printer 12, or receipt layout changes. Because the information related to a product purchase is printed on the receipt for the customer to see, or for proof of purchase, there are rules that have been standardized by custom. In other words, regardless of the layout, certain information is printed on each receipt according to the basic receipt rules.

One basic receipt rule is that the printing area on a receipt is divided by area break information, and the information printed on a receipt is separated into specific areas by the area break information. The reason for this is described below. That is, information with different attributes (different meaning) is printed on a receipt, including information about the store (business) where the customer made the purchase (such as logo information J1, store address information J2, store telephone number related information J3), information about the purchased products (such as detail information J6), information related to the receipt itself (such as receipt identification related information J4, time stamp J5), and information related to the customer's payment (such as subtotal related information J7, tax related information J8, transaction total related information J9). Breaking the printed area of a receipt into areas based on the area break information, and printing information with the same or similar attributes in each area, makes it easier for the customer reading the receipt to acquire the desired information from the receipt.

Another basic receipt rule is that area break information is information comprising the same special character (described below) printed plural times continuously on one line.

The special characters are any characters that can function suitably as area break information, and in this example are the hyphen (-) and tilde (~) characters. The special characters are not limited to these examples, however, and other characters such as =, @, *, and + may be used, for example.

Another basic receipt rules is that no information other than the area break information is printed on the same line as area break information.

Information indicating the special characters that may be used as the characters as area break information is stored in the control server storage 42 of thermal head control server 15. In step SD8, the first program executor 401 identifies as area break information any information containing at least a specific number of the registered special characters printed continuously on one line that are extracted as a specific word with no other information included on the same line.

Next, the first program executor 401 identifies in the printed text data the areas delimited by the identified one or plural area break information. Next, the first program executor 401 identifies the target words in each area, and generates area data describing the correlation between each area and the target words in each area, together with the line to which the target words belong (step SD8). Note that special characters are not included in words or word groups.

The areas segmented by the area break information in the printed text data are referred to below as the first area, second area to n-th area starting from the top of the receipt.

FIG. 11 shows an example of the content of area data AD1 generated based on the printed text data T1 (FIG. 5).

Based on the printed text data T1, the first program executor 401 identifies as area break information: the word "- - - • • • -" associated with the first instance of area break information SK1; the word "- - - • • • -" associated with the second instance of area break information SK1; the word "- - - • • • -" associated with the first instance of second area break information SK2; and the word "- - - • • • -" associated with the third instance of area break information SK1. Next, the first program executor 401 separates the printed text data T1 into areas using the identified area break information, and identifies the target words in each area. Next, the first program executor 401 generates area data AD1 as shown in the example in FIG. 11 based on the relationships between the areas and the target words in each area.

After step SD8, the first program executor 401, by outputting specific information to the second program executor 402, reports to the second program executor 402 that creating the word data (word data TD1 in FIG. 9), line data (line data GG1 in FIG. 10), and area data (area data AD1 in FIG. 11) is finished (step SD9).

As shown in column (B) of FIG. 7, once the information output by the first program executor 401 in step SD9 is acquired, the second program executor 402 displays a detection information input screen G121 (FIG. 12) on the control server display 43 (step SE4).

Figure 12:
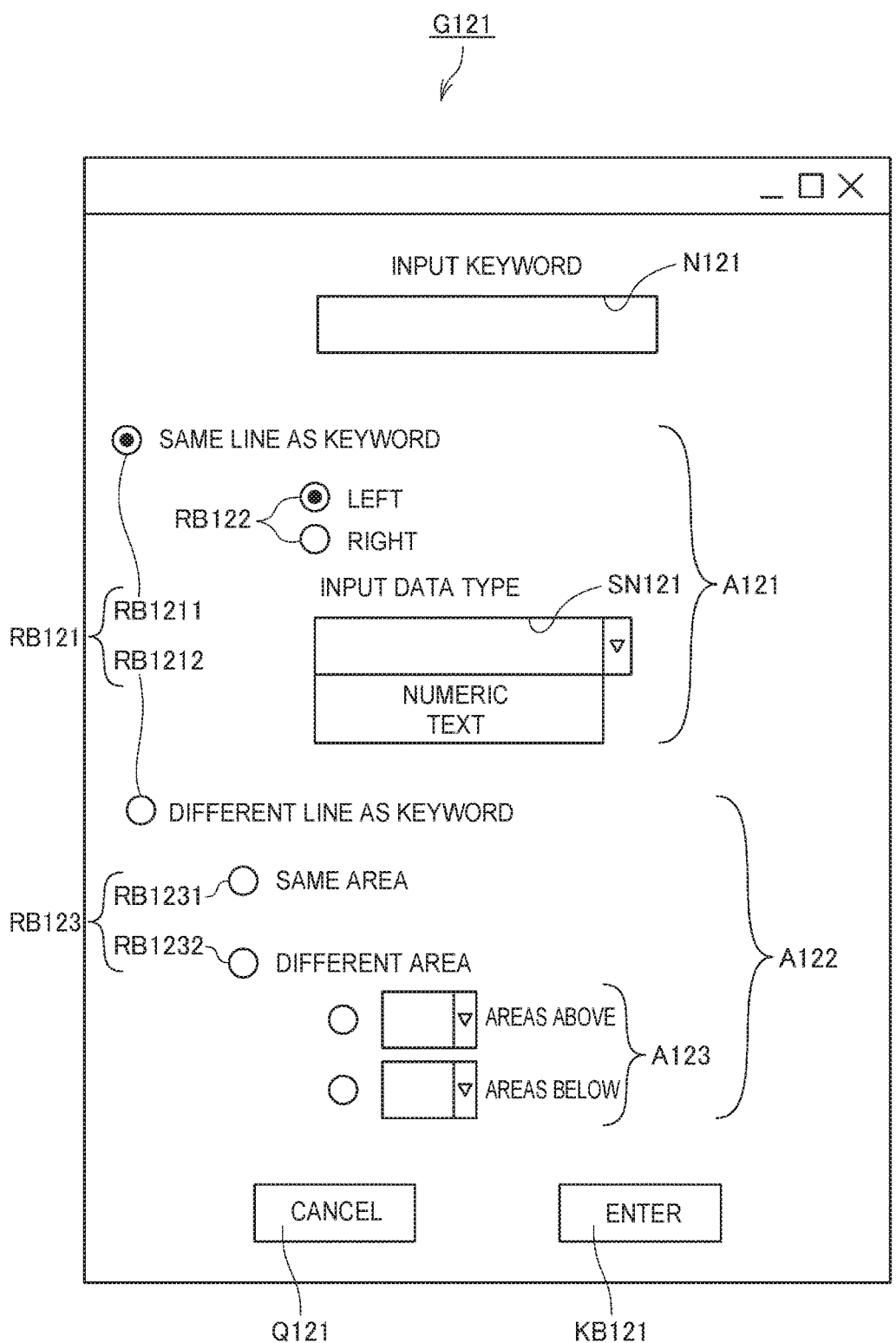
FIG. 12 shows an example of a search data input screen.

FIG. 12 shows an example of a detection information input screen G121.

The detection information input screen G121 is a screen for receiving, for the target words corresponding to the information the user wants to acquire (referred to below as detection target words, which are the words to find), keyword information J13 (described below) indicating the keywords to use for finding the target words, and relation information J19 (described below) describing the relationship between keywords. As will be understood below, the first program executor 401 can search for (detect) detection target words based on the keyword information J13 and relation information J19. In other words, the first program PG1 has a function for detecting detection target word based on the keyword information J13 and relation information J19.

The "data type" of words in the printed text data is defined as follows.

Specifically, the data type of words expressing a numeric value without a decimal point, words expressing a numeric value with a decimal point, and words expressing information including a numeric value and a unit, is defined as numeric. For example, the word "1" and the word "10.00" are both words of the numeric type. Information expressing a unit includes currency symbols (such as $, ¥), strings expressing a unit of currency (such as dollar, yen), and strings commonly used as characters indicating a unit (such as @). Words including a numeric value and a unit include, for example, $76.13, 100 yen, and @1.

The data type of words containing numeric information and including a character representing a unit other than a currency symbol or unit is defined as text.

A character of the printed text data for a receipt is that, of the information printed on a receipt, target words related to specific information can be identified by their relationship to other specific target words. For example, in the printed text data in the example in FIG. 5, the target word for the subtotal information J72 is, in relation to the target word for the subtotal identifier J71, on the same line as the target word for the subtotal identifier J71, and is on the right side of the subtotal identifier J71.

The user inputs, to the detection information input screen G121, keyword information J13 that can identify a target word in a specific relationship to the detection target word; and relation information identifying the relationship between the detection target word, and the target word identified by the keyword in the input keyword information.

As shown in FIG. 12, the detection information input screen G121 has a keyword input field N121 for inputting the keyword information J13, which is information indicating the keyword. The user inputs keyword information J13 to the keyword input field N121.

As shown in FIG. 12, the detection information input screen G121 has a radio button group RB121 for selecting whether or not the target word of the keyword information J13 and the detection target word are on the same line. The radio button group RB121 includes a radio button RB1211 that is selected when the target word of the keyword information J13 and the detection target word are on the same line, and a radio button RB1212 that is selected when the target word of the keyword information J13 and the detection target word are not on the same line. Depending on whether or not that the target word of the keyword information J13 and the detection target word are on the same line, the user selects either radio button RB1211 or radio button RB1212.

As shown in FIG. 12, detection information input screen G121 also has an area A121 associated with radio button RB1211.

Area A121 is an area for inputting information if radio button RB1211 is selected. Area A121 has a radio button group RB122 for selecting if, when the detection target word is on the same line as the target word in the keyword information J13, the detection target word is on the left or on the right side of the target word in the keyword information J13. The user selects one of the radio buttons in the radio button group RB122 according to the position of the detection target word to the target word of the keyword information J13. Area A121 also has a data type selector SN121 for selecting the data type of the detection target word. The data type selector SN121 is a pull-down menu, the pull-down menu including an item denoting a numeric type and an item denoting a text type. The user selects the appropriate item from the pull-down menu according to the data type of the detection target word.

As shown in FIG. 12, detection information input screen G121 also has an area A122 associated with radio button RB1212.

Area A122 is an area for inputting search parameters when radio button RB1212 is selected. Area A122 has a radio button group RB123 for selecting if the detection target word is in the same area as the target word in the keyword information J13. The radio button group RB123 includes a radio button RB1231 that is selected when the target word of the keyword information J13 and the detection target word are in the same area, and a radio button RB1232 that is selected when the target word of the keyword information J13 and the detection target word are not in the same area. Depending on whether or not that the target word of the keyword information J13 and the detection target word are in the same area, the user selects either radio button RB1231 or radio button RB1232.

The detection information input screen G121 also has an area A123 associated with radio button RB1232.

Area A123 is an area for inputting information when radio button RB1232 is selected. More specifically, area A123 is an area for inputting information indicating the relationship (relative positions) between the area containing the detection target word and the area containing the target word of the keyword information J13.

The user inputs information indicating how many areas above, or how many areas below, the area containing the detection target word is relative to the area containing the target word of the keyword information J13.

A basic receipt rule is that information with the same or related attributes is printed in the same area or a nearby area. Based on this basic rule, if the detection target word and target word of the keyword information J13 are not on the same line, the user inputs, to the detection information input screen G121, information indicating the relationship between words using these areas.

As shown in FIG. 12, the detection information input screen G121 also has an Enter button KB121. To confirm input to the detection information input screen G121, the user operates the Enter button KB121.

The detection information input screen G121 also has a Cancel button Q121. The user operates the Cancel button Q121 to cancel input to the detection information input screen G121 and stop detecting words.

As shown in FIG. 7, after displaying the detection information input screen G121 in step SE4, the second program executor 402 monitors if the Cancel button Q121 was operated (step SE5), and monitors if the Enter button KB121 was operated (step SE6).

If operation of the Cancel button Q121 is detected (step SE5: YES), the second program executor 402 ends the process.

If operation of the Enter button KB121 is detected (step SE6: YES), the second program executor 402 acquires information based on the input to the detection information input screen G121 (step SE7).

More specifically, in step SE7, the second program executor 402 acquires the keyword information J13 input to the keyword input field N121.

The second program executor 402 also acquires, if radio button RB1211 (the radio button selected when the detection target word and target word of the keyword information J13 are on the same line) was selected, the following information based on input to area A121. More specifically, the second program executor 402 acquires information (referred to below as left/right position J14) identifying whether the detection target word is on the left or right side of the target word of the keyword information J13, and information indicating the data type of the detection target word (referred to below as the target word data type J15).

If radio button RB1212 (the radio button selected when the detection target word and the target word of the keyword information J13 are not on the same line) is selected, and radio button RB1231 (the radio button selected when the detection target word and the target word of the keyword information J13 are in the same area) is also selected, the second program executor 402 acquires information (referred to below as same-area information J16) indicating that the detection target word is in the same area as the keyword information J13.

If radio button RB1212 (the radio button selected when the detection target word and the target word of the keyword information J13 are not on the same line) is selected, and radio button RB1232 (the radio button selected when the detection target word and the target word of the keyword information J13 are not in the same area) is also selected, the second program executor 402 acquires information (referred to below as different-area information J17) indicating that the detection target word is not in the same area as the keyword information J13.

Based on input to area A123, the second program executor 402 also acquires information (referred to below as area relationship information J18) indicating the location of the are containing the detection target word in relation to the area containing the target word of the keyword information J13.

Of the information the second program executor 402 acquires in step SE7, the information not including the keyword information J13 is an example of relation information indicating the relationship between the keyword and the word to detect. Of the information the second program executor 402 acquires in step SE7, the information not including the keyword information J13 is referred to below as relation information J19.

As shown in column (B) of FIG. 7, after acquiring the keyword information J13 and relation information J19 in step SE7, the second program executor 402 outputs this information to the first program executor 401 (step SE8).

As shown in column (A) of FIG. 7, the first program executor 401 then acquires the keyword information J13 and relation information J19 the second program executor 402 output (step SD10).

Next, the first program executor 401, based on the keyword information J13 and relation information J19, and using the word data (word data TD1 in FIG. 9), line data (line data GG1 in FIG. 10), and area data (area data AD1 in FIG. 11) that was generated, executes a process of detecting the detection target word (step SD11).

The process of the first program executor 401 in step SD11 is described below using three examples: when the relation information J19 is the left/right position J14 and target word data type J15; when the relation information J19 is the same-area information J16; and when the relation information J19 is the different-area information J17 and area relationship information J18.

When the Relation Information J19 is the Left/Right Position J14 and Target Word Data Type J15

The first program executor 401, referring to the line data, identifies the line containing the target word of the keyword information J13. Next, the first program executor 401, referring to the line data, identifies on that line the target word that is located, relative to the target word of the keyword information J13, in the direction defined by the left/right position J14, and is the target word of the data type defined by the target word data type J15. The number of identified target words may be zero or more. The first program executor 401 then acquires the one or more identified target words. The acquired target words are detection target words detected by the first program executor 401. If the number of identified target words is 0, the first program executor 401 determines the detection target word was not found.

When the Relation Information J19 is the Same-Area Information J16

The first program executor 401, referring to the area data, identifies the area containing the target word of the keyword information J13. Next, the first program executor 401 acquires the target words in that area. The acquired target word is the detection target word detected by the first program executor 401.

When the Relation Information J19 is Different-Area Information J17 and Area Relationship Information J18

The first program executor 401, referring to the area data, identifies the area containing the target word of the keyword information J13. Next, the first program executor 401 identifies the area located, in relation to the area identified as the area containing the target word of the keyword information J13, at the position defined by the area relationship information J18. Next, the first program executor 401 acquires the target words in the identified area. The acquired target word is the detection target word detected by the first program executor 401.

After detecting the detection target word, or determining that the detection target word was not detected, the first program executor 401 outputs information indicating the result of step SD11 to the second program executor 402 (step SD12).

If the detection target word was detected, the information indicating the result of step SD11 is information indicating the detection target word. If the detection target word was not detected, the information indicating the result of step SD11 is information indicating the detection target word was not detected.

As shown in column (B) of FIG. 7, the second program executor 402 acquires the information the first program executor 401 output (step SE9).

Next, the second program executor 402, based on the information acquired in step SE9, displays a detection result screen GM on the control server display 43 (step SE10).

Figure 13:
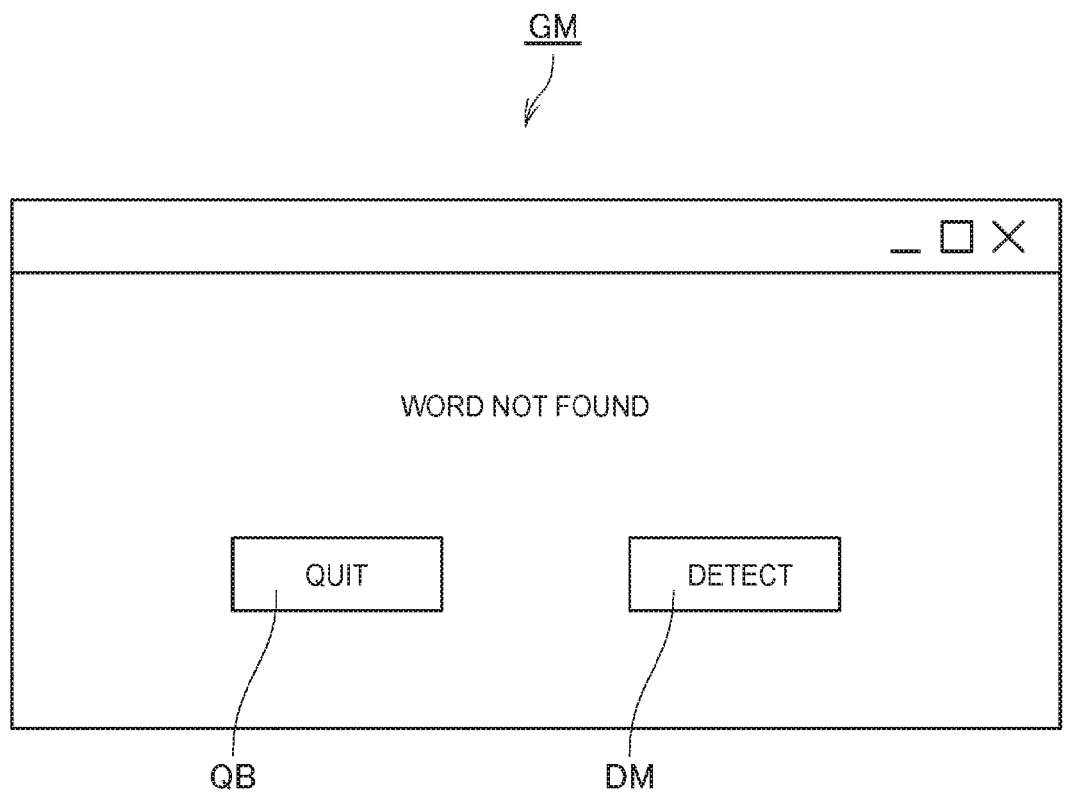
FIG. 13 shows an example of a search result screen.

FIG. 13 shows an example of the detection result screen GM when the detection target word was not detected by the first program executor 401.

As shown in FIG. 13, when the detection target word was not detected by the first program executor 401, the second program executor 402 displays a detection result screen GM indicating that the detection target word was not detected.

Figure 14:
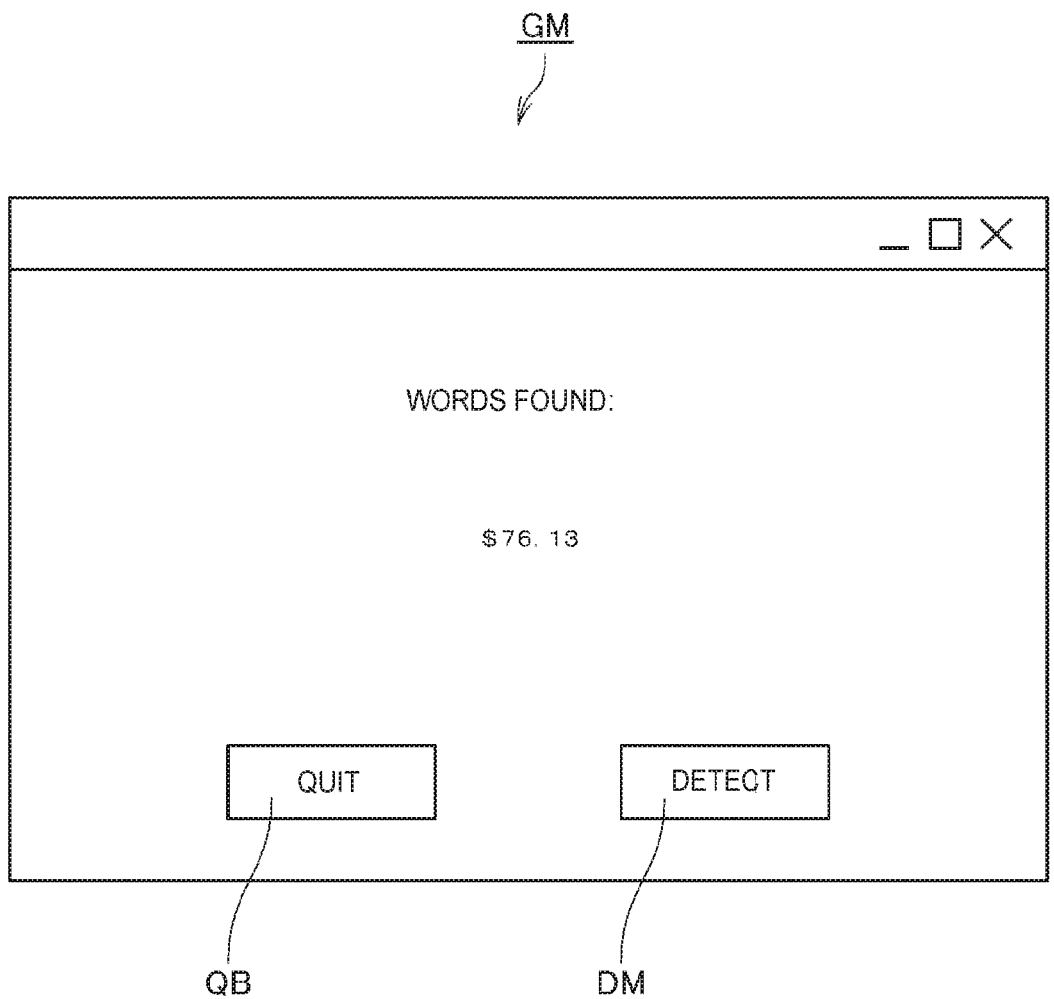
FIG. 14 shows an example of a search result screen.

FIG. 14 shows an example of a detection result screen GM displayed when detecting a detection target word on the same line as the target word of the keyword information J13 was instructed, and one detection target word was found by the first program executor 401.

FIG. 14 illustrates information displayed using the printed text data T1 in the example in FIG. 5 when the keyword information J13 is the string TOTAL, the left/right position J14 specifies the right, and the target word data type J15 specifies a numeric value. In this example, the first program executor 401, referencing area data AD1 in FIG. 11, detects $76.13, which is the numeric value on the right of the line containing the string TOTAL. The word $76.13 is displayed in this example of the detection result screen GM.

The user can easily and correctly know the value of the detection target word that was found by reading the detection result screen GM.

Figure 15:
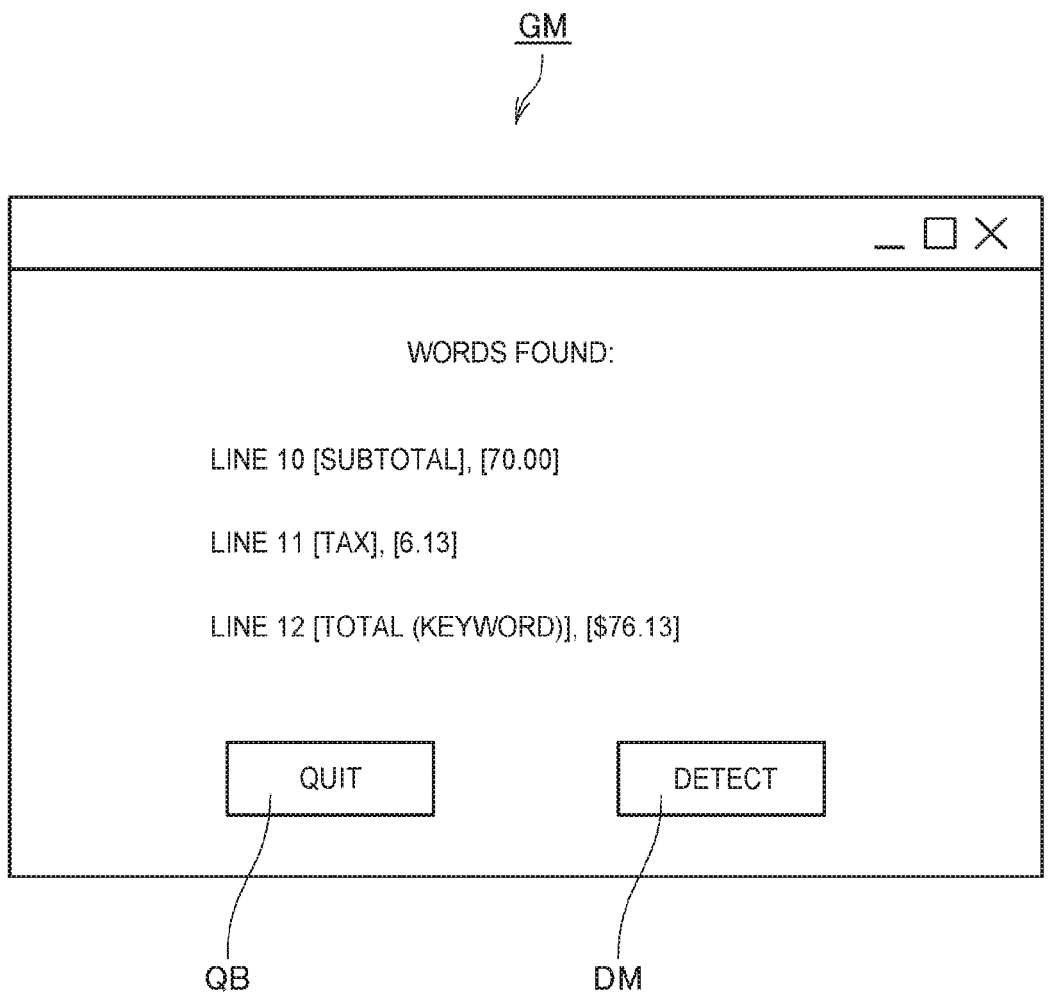
FIG. 15 shows an example of a search result screen.

FIG. 15 shows an example of a detection result screen GM displayed when detecting a detection target word in the same area as the area containing the target word of the keyword information J13 was instructed, and multiple detection target words were found by the first program executor 401 referring to area data AD1 in FIG. 11.

FIG. 15 shows an example of the detection result screen GM using the printed text data T1 in the example in FIG. 5 when the keyword information J13 is the string TOTAL.

In the detection result screen GM in the example in FIG. 15, the relative positions of the target words contained in the fourth area of the area data AD1 in FIG. 11, which is the same area as the area containing the target word TOTAL defined by the keyword information J13, and the line number of each target word, are shown.

The user can easily and correctly know the value of the detection target words that were found by reading the detection result screen GM.

Figure 16:
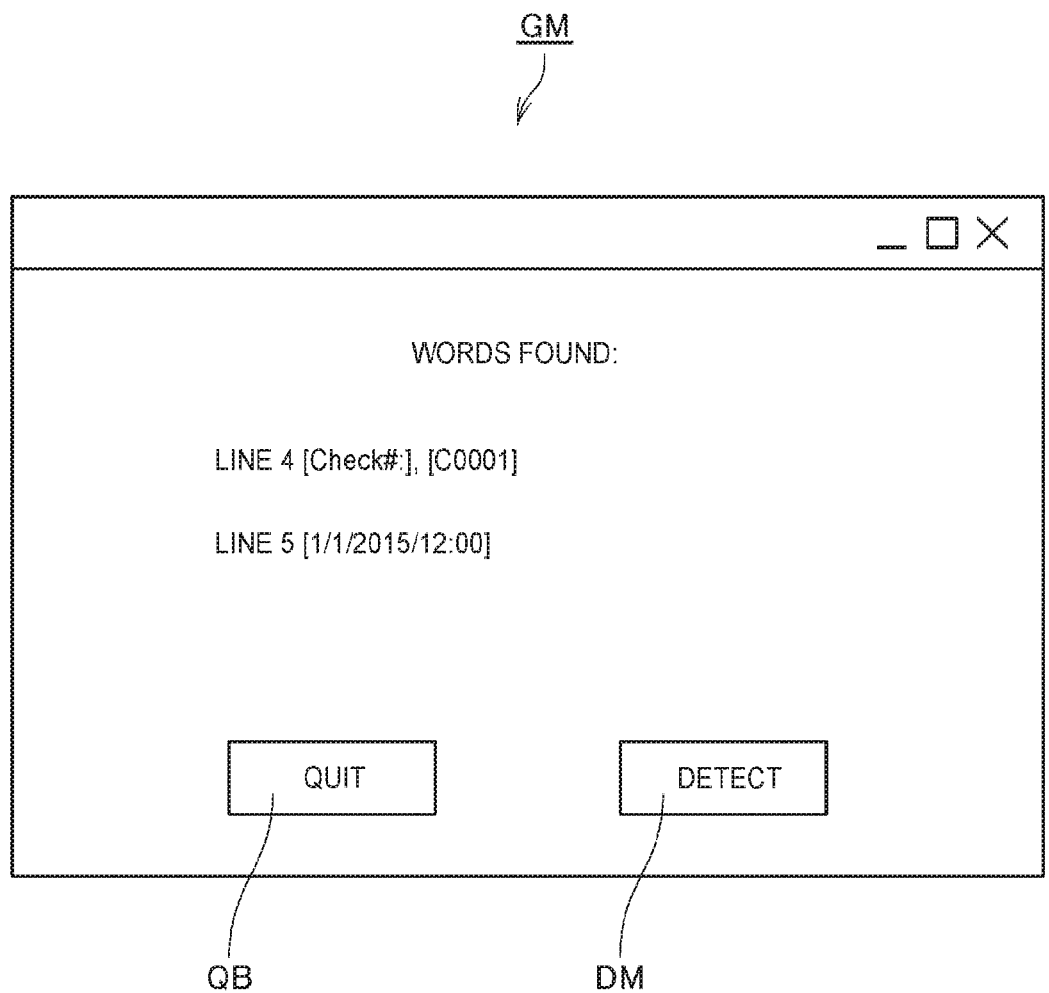
FIG. 16 shows an example of a search result screen.

FIG. 16 shows an example of a detection result screen GM displayed when detecting a detection target word in a different area than the area the containing the target word of the keyword information J13 was instructed, and multiple detection target words were found by the first program executor 401 referring to area data AD1 in FIG. 11.

FIG. 16 shows an example of the detection result screen GM using the printed text data T1 in the example in FIG. 5 when the keyword information J13 is the string TOTAL, and the area relationship information J18 is set to two areas above the area containing the keyword information J13.

In the detection result screen GM in the example in FIG. 16, the relative positions of the target words contained in the second area, which is the area two above, as defined by the area relationship information J18, the fourth area, which is the area containing the target word TOTAL defined by the keyword information J13, and the line number of each target word, are shown.

The user can easily and correctly know the value of the detection target words that were found by reading the detection result screen GM.

As shown in FIG. 13 to FIG. 16, the detection result screen GM has a Quit button QB for stopping the process, and a Detect button DM for instructing detecting words again.

After displaying the detection result screen GM, the second program executor 402 monitors operation of the Quit button QB and Detect button DM (step SE11).

If operation of the Quit button QB is detected (step SE11: QUIT), the second program executor 402 quits the process. If operation of the Detect button DM is detected (step SE11: DETECT), the second program executor 402 returns to step SE4.

As described above, in this embodiment of the invention the first program PG1 is a program that a controller in a computer, such as the control server 15, can read and run from memory. The first program PG1 has a function enabling a control server 15 that communicates with the printer 12 to receive printed information from the printer 12, the printed information being printed text data (text data) that is printed as text characters, deconstruct the information contained in the printed text data, and generate multiple words; and a function for, based on keyword information and the relationship between the keyword information and words targeted for detection, detecting the target words from the multiple words that were generated.

By functions of the first program PG1, the control server controller 40 (controller) of the control server 15 in this example deconstructs the information contained in the received printed text data and generates words, and based on keyword information and the relationship between the keyword information and words targeted for detection in the printed text data, detects the target words from the multiple words that were generated.

After deconstructing and generating words from information contained in the printed text data, the control server 15, by functions of the first program PG1, can detect specific target words based on keyword information and the relationship between the keyword information and target words, and can therefore accurately detect specific desired information contained in the printed information.

As described above, in this embodiment of the invention the second program PG2 is a program that a controller in a computer, such as the control server 15, can read and run from memory, and which can exchange information with the first program PG1. The second program PG2 receives keyword information specifying a keyword, and a related information statement specifying a relationship between the keyword information and the target word to detect; outputs the specified keyword information and relation information to the first program PG1; receives input of information specifying the target word to detect from the first program PG1; and displays information indicating the target word that was input for detection.

In this embodiment, the control server controller 40 of the control server 15, by functions of the first program PG1 and second program PG2, deconstructs information contained in printed text data and generates words from the printed text data; receives keyword information specifying a keyword, and a related information statement specifying a relationship between the keyword information and the target word to detect; based on the keyword information and the relationship, specified by the relation information, between keyword information and the target word to detect, detects the target words in the generated words; and displays information showing the target words that were detected.

After deconstructing and generating words from information contained in the printed text data, the control server 15, by functions of the first program PG1 and second program PG2, can detect the target words based on the keyword information and the relationship between the keyword information and the target word to detect, and can display the detected words. As a result, the control server 15 can desirably detect specific desired information contained in printed information, and the user can know the detected result.

The first program PG1 in this example also has a function for detecting specific target words from words that are generated based on keyword information, the relationship between the keyword information and the target words to detect, and the data types of the target words.

The second program PG2 receives an instruction specifying the data type of the target word to detect, and outputs information specifying the data type to the first program PG1.

As a result, target words can be detected even more precisely based on the data type of the specified target word.

The invention is described above with reference to a preferred embodiment thereof, but the invention is not limited thereto and can be modified and adapted in many ways without departing from the scope of the accompanying claims.

For example, when the control method of the control server 15 (control method of the information processing device) is implemented by a computer of the control server 15 or using an external device connected to the control server 15, the invention may be embodied as a program the controller of the computer executes to implement the control method, a computer-readable recording medium storing the program, or a transmission medium that transmits the program. The recording medium may be a magnetic or optical recording medium, or a semiconductor memory device. More specifically, the recording medium may be a floppy disk, HDD (Hard Disk Drive), CD-ROM (Compact Disk Read Only Memory), DVD (Digital Versatile Disk), Blu-ray® Disc, magneto-optical disc, flash memory, memory card media, or other type of removable or fixed recording medium. Further alternatively, the recording medium may be RAM (random access memory), ROM (read-only memory), hard disk drive, or other nonvolatile internal storage medium of the control server 15 or external device connected to the control server 15.

The program is separated into a first program PG1 and a second program PG2 in the above embodiment, but may be configured as a single program.

Further alternatively, in the embodiment described above the printer 12 generates printed text data based on the print data appropriate to a transaction. However, a configuration in which the control server 15 receives print data from the printer 12, and generates printed text data based on the received print data, is also conceivable.

Furthermore, in the embodiment described above the printer 12 and the tablet terminal 13 functioning as a host computer communicate wirelessly. However, communication between the printer 12 and host computer is not limited to wireless communication, and configurations that use a wired LAN communication protocol, or wired communication using a serial communication protocol such as USB or other serial standard, or a parallel communication standard, are possible. The host computer is also not limited to a tablet device such as the tablet terminal 13, and may be configured as a desktop device.

The function blocks described above with reference to the figures can be embodied as desired by the cooperation of hardware and software, and do not suggest a specific hardware configuration.

What is claimed is:

1. A non-transitory controller readable medium storing a program causing a controller in a computer to execute steps including:
   receiving print information from a printer with which the computer can communicate, the print information being text data written as text;
   deconstructing the text data and generating multiple words;
   acquiring keyword information identifying a keyword, and the relation information identifying a relationship between the keyword information and a word to detect; and
   detecting from the multiple words, based on the keyword information and the relation information, the word to detect.

2. The non-transitory controller readable medium described in claim 1, wherein:
   the program includes a first program and a second program configured to exchange information therebetween,
   the first program causing the controller to execute steps including:
      deconstructing the text data and generating multiple words;
      receiving input of the keyword information and the relation information from the second program;
      detecting from the multiple words, based on the keyword information and the relation information, the word to detect; and
      outputting to the second program the detected word to detect; and
   the second program causing the controller to execute steps including:
      acquiring and outputting the keyword information and the relation information to the first program; and
      receiving input of the word to detect from the first program.

3. The non-transitory controller readable medium described in claim 1, wherein:
   the keyword information is information related to a payment transaction process.

4. The non-transitory controller readable medium described in claim 1, wherein:
   the the relation information is data type information indicating a data type; and
   the program causes the controller to execute steps including:
      detecting from the multiple words, based on the keyword information and the data type information, the word to detect.

5. The non-transitory controller readable medium described in claim 1, wherein the program causes the controller to execute steps including:
   displaying information indicating the word to detect.

6. The non-transitory controller readable medium described in claim 1, wherein:
   the print information is printed by the printer as a receipt.

7. A control method of an information processing device having a controller, the control method using the controller to execute steps including:
   receiving print information from a printer with which the information processing device can communicate, the print information being text data written as text;
   deconstructing the text data and generating multiple words;
   acquiring keyword information identifying a keyword, and relation information identifying a relationship between the keyword information and a word to detect; and
   detecting from the multiple words, based on the keyword information and the relation information, the word to detect.

8. The control method of an information processing device described in claim 7, wherein:
   the keyword information is information related to a payment transaction process.

9. The control method of an information processing device described in claim 7, wherein:
   the relation information is data type information indicating a data type;
   the control method including:
   detecting from the multiple words, based on the keyword information and the data type information, the word to detect.

10. The control method of an information processing device described in claim 7, including:
    displaying information indicating the word to detect.

11. The control method of an information processing device described in claim 7, wherein:
    the print information is printed by the printer as a receipt.

12. An information processing device comprising:
    a communicator configured to communicate with a printer;
    a controller; and
    storage storing a program;
    the controller reading the program from the storage and executing steps including:
    receiving print information from the printer, the print information being text data written as text;
    deconstructing the text data and generating multiple words;
    acquiring keyword information identifying a keyword, and relation information identifying a relationship between the keyword information and a word to detect; and
    detecting from the multiple words, based on the keyword information and the relation information, the word to detect.

13. The information processing device described in claim 12, wherein:
    the storage stores a first program and a second program configured to exchange information therebetween;
    the controller reads the first program from the storage and executes steps including:
      deconstructing the text data and generating multiple words;
      receiving input of the keyword information and the relation information from the second program;

detecting from the multiple words, based on the keyword information and the relation information, the word to detect; and outputting to the second program the detected word to detect; and the controller reads the second program from the storage and executes steps including:

acquiring and outputting the keyword information and the relation information to the first program; and receiving input of the word to detect from the first program.

14. The information processing device described in claim 12, wherein:

the keyword information is information related to a payment transaction process.

15. The information processing device described in claim 12, wherein:

the the relation information is data type information indicating a data type;

the controller reading the program from the storage and executing steps including:

detecting from the multiple words, based on the keyword information and the data type information, the word to detect.

16. The information processing device described in claim 12, further comprising:

a display, the display displaying information indicating the word to detect.

17. The information processing device described in claim 12, wherein:

the print information is printed by the printer as a receipt.

18. The information processing device described in claim 12, wherein:

the information processing device and the printer are in a server-client relationship.

19. The information processing device described in claim 12, wherein the relationship identified in the the relation information is the relationship within the print information between the keyword and the word to detect.

20. The information processing device described in claim 12, wherein the relationship identified in the the relation information is the relative position between the keyword and the word to detect.

* * * * *